April 24, 1934.    F. J. YOUNG    1,956,432
BAND BRAKE ASSEMBLY
Filed Aug. 28, 1929    3 Sheets-Sheet 1

Inventor
Forrest Joseph Young
By Lyon & Lyon
Attorneys

April 24, 1934.　　　F. J. YOUNG　　　1,956,432
BAND BRAKE ASSEMBLY
Filed Aug. 28, 1929　　　3 Sheets-Sheet 2

Inventor
Forrest Joseph Young
By Lyon & Lyon
Attorneys

April 24, 1934.　　　F. J. YOUNG　　　1,956,432
BAND BRAKE ASSEMBLY
Filed Aug. 28, 1929　　　3 Sheets-Sheet 3
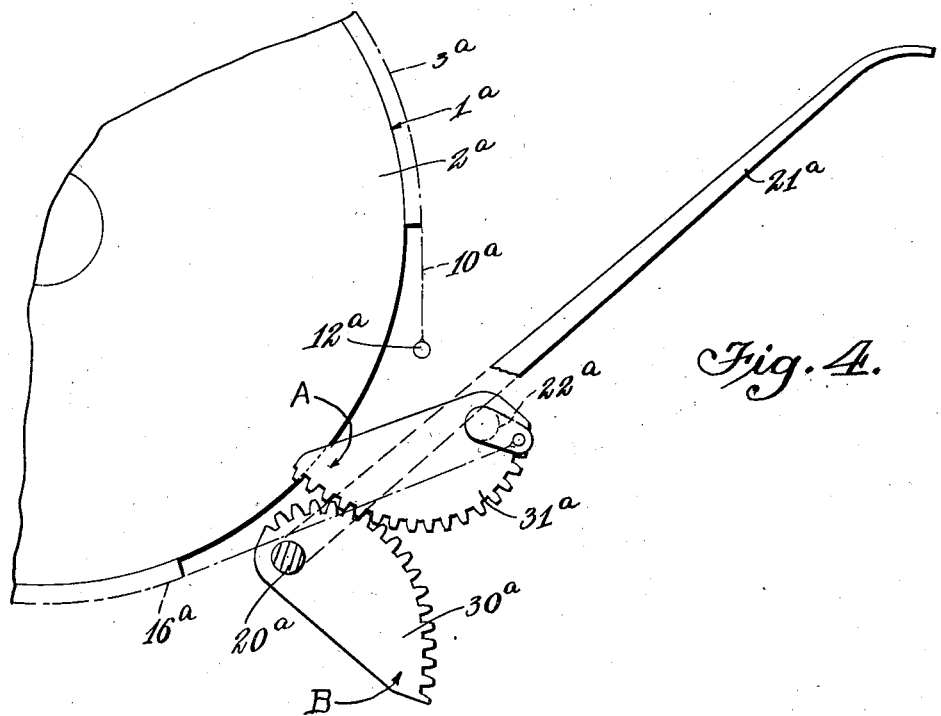
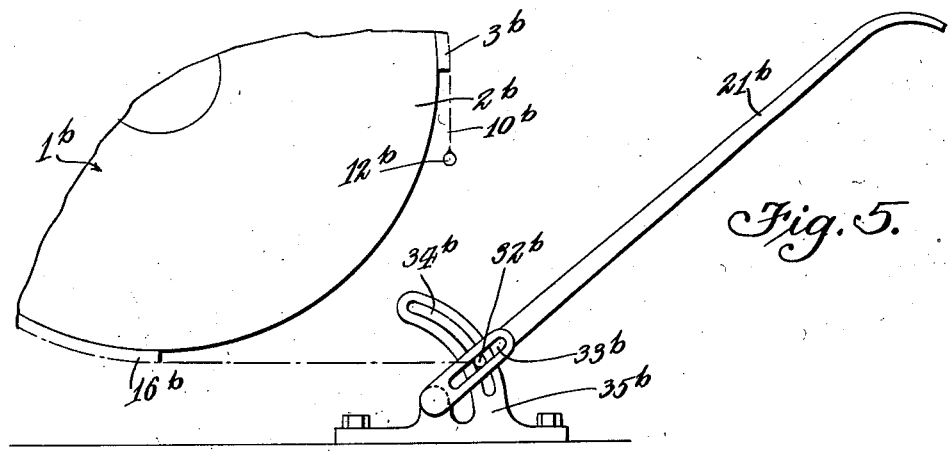
Inventor
Forrest Joseph Young
By Lyon & Lyon
Attorneys Patented Apr. 24, 1934

1,956,432

UNITED STATES PATENT OFFICE 1,956,432

BAND BRAKE ASSEMBLY

Forrest Joseph Young, Torrance, Calif., assignor, by mesne assignments, to The National Superior Company, Toledo, Ohio, a corporation of Delaware Application August 28, 1929, Serial No. 388,940

4 Claims. (Cl. 188—77)

This invention relates to brake band assemblies and is more particularly related to a band brake assembly adapted for use in a rotary drawworks as employed in the rotary process of drilling oil wells.

An object of this invention is to provide a band brake assembly including an actuating mechanism for tightening the brake bands upon the brake rims of a drum of a rotary drawworks or like hoisting drum to obtain the same braking torque as is obtained by the use of a straight lever brake actuating mechanism and with less effort upon the part of the operator of the mechanism and at the same time to maintain the same travel of the live end, or ends, of the brake bands as is now obtained using the straight lever band brake actuating mechanism so that the brake lining will freely and quickly disengage itself from the brake rim or rims upon release of the brake lever without increasing the total travel of the lever used for actuating the brake bands.

Another object of this invention is to provide a brake actuating means, including a lever and means attached to the live end of the brake band of said brake mechanism so constructed and connected that upon actuation of the brake lever the leverage acting to tighten the brake band upon the brake rim becomes greater as the brake band is tightened on the brake rim and the leverage decreases rapidly as the brake lever is thrown to a position to release the brake band from the brake rim.

Other objects and advantages of this invention it is believed will be apparent from the following detailed description of a preferred embodiment thereof as illustrated in the accompanying drawings.

In the drawings:

Figure 4 is a diagrammatic side elevation of a modified form of brake actuated mechanism embodying this invention.

Figure 5 is a side elevation of a third modified form of brake actuating mechanism embodying this invention.

Figure 1:
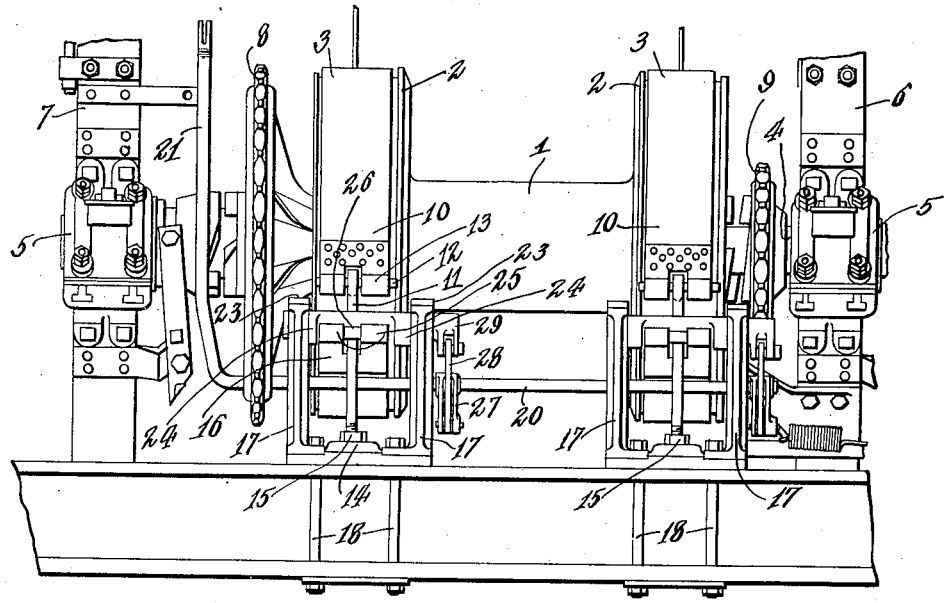
Figure 1 is a fragmental front elevation of a rotary drawworks embodying this invention illustrating a brake actuating means embodying this invention as adapted thereto.
Figure 2:
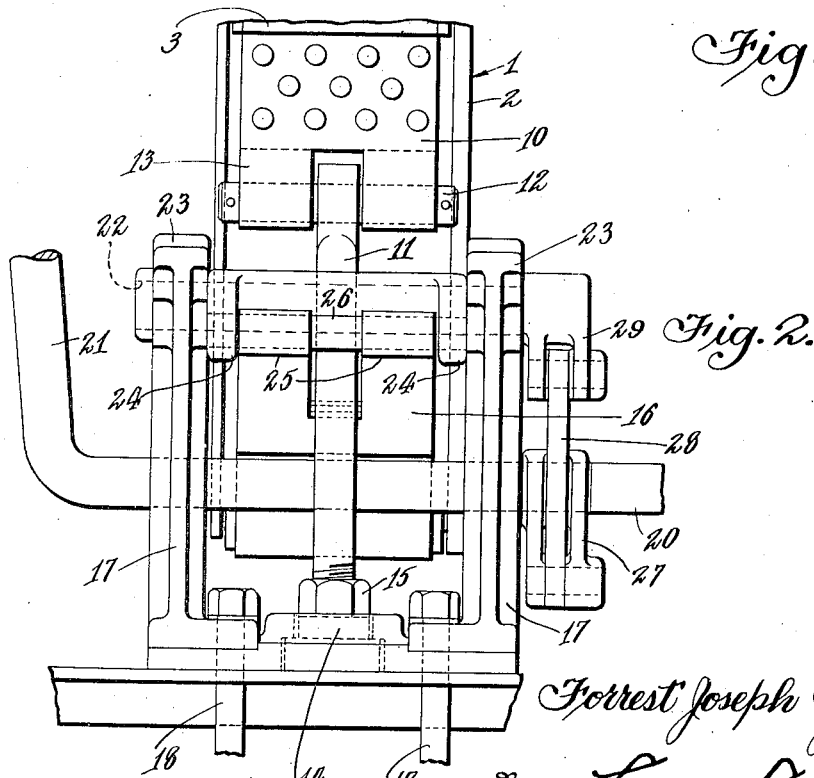
Figure 2 is an enlarged front elevation of a brake actuating mechanism embodying this invention illustrating the same connected with the brake band of a rotary drawworks shown fragmentally.
Figure 3:
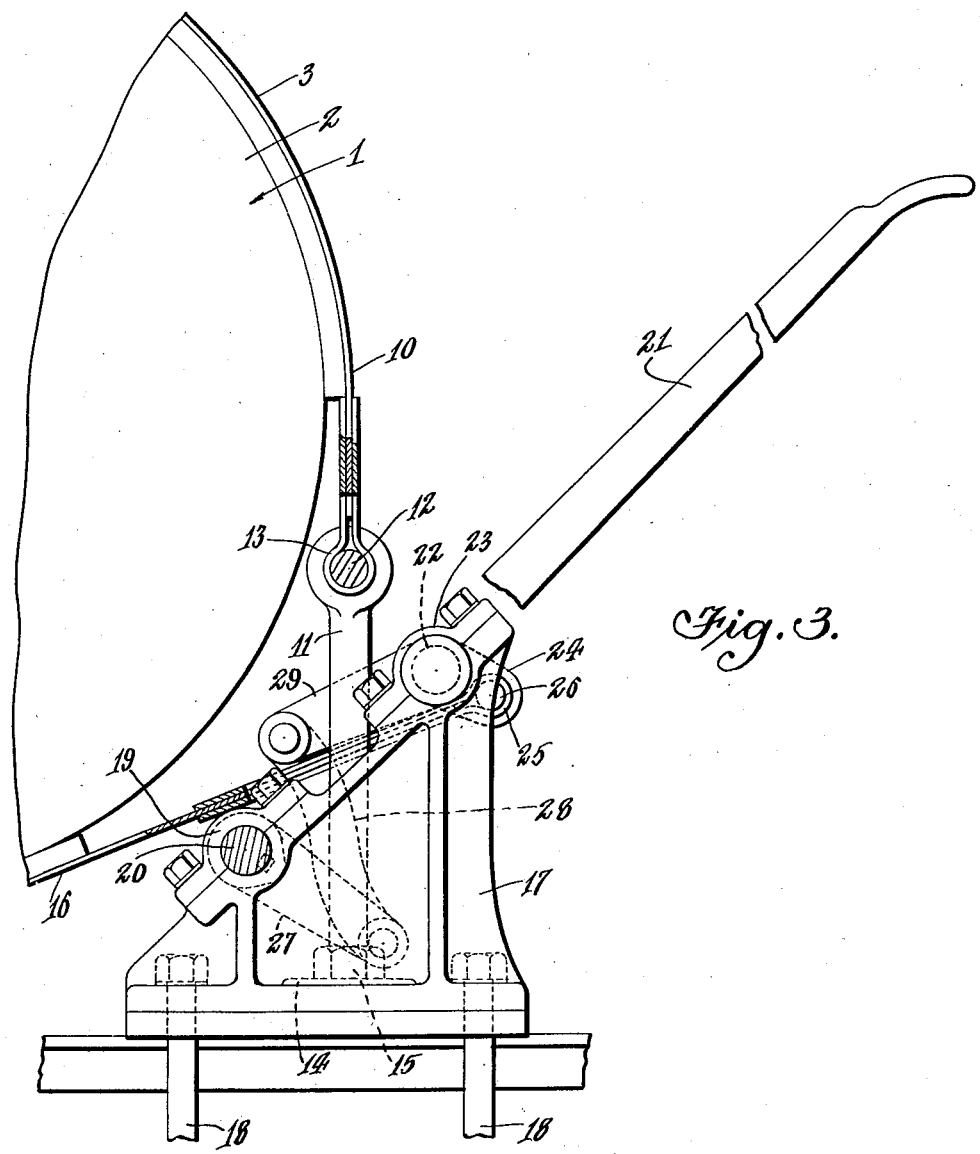
Figure 3 is a side elevation of the brake actuating mechanism illustrated in Figure 2.

In the preferred embodiment of this invention illustrated in Figures 1 to 3 of the drawings 1 indicates the drum of a rotary drawworks which may be of any suitable or desirable construction, as is well understood in the art, and which has formed at its opposed ends brake rims 2 upon which brake bands 3 are mounted. The drum 1 is mounted on a shaft 4 supported in bearings 5 on the posts 6 and 7 of the rotary drawworks, and is driven at variable speeds through sprockets 8 and 9. Means are provided for actuating the brake bands 3 on the brake rims 2, which means are as shown in the preferred embodiment of this invention illustrated in Figures 1 and 2.

The "dead" ends, or stationary ends, 10 of the brake band 3 are secured in position in any suitable or desirable manner, as herein illustrated, by means of eye bolts 11 secured to the ends 10 of the brake bands 3 by means of pins 12 passing through eyes 13 formed by clips secured to the ends 10 of the brake band 3. The opposite ends of the eye bolt 11 are adjustably secured to the floor of the derrick or like structure. The eye bolts 11 are screw-threaded into nut 15 contained in bracket 14, which nut is provided with a lock. The brake bands 3 may be adjusted upon the rims 2 by the screw-threading of the nut 15 on the eye bolts 11.

The means provided for actuating the live ends 16 of the brake bands preferably includes brackets 17, which are secured to the floor of the derrick or like structure, in position in alignment with the rims 2 by means of bolts 18. Supported in bearings 19 of the brackets 17 is a brake actuating shaft 20. The brake actuating shaft 20 is provided with an actuating handle 21 which may be formed in any suitable or desirable manner such, for example, as by bending the shaft 20 at right angles. The means provided for actuating the live ends 16 of the brake bands are the same for each brake band 3 and each is connected with a brake actuating shaft 20 in the same manner so that only one of these means will be specifically described.

Supported by the bracket 17 is a brake arm pin 22. The brake arm pin 22 is supported by the bracket 17 in a bearing 23. A crank is provided by a pair of spaced brake arms 24 between which the eye clip 25 secured to the live end 16 of the brake band 3 is secured by means of a pin 26. Means are provided for connecting the shaft 20 with the pin 22 in a manner to compound the leverage produced through the actuation of a handle 21, which means in the preferred embodiment of this invention include a bifurcated arm 27 which is secured to the shaft 20 by any suitable or desirable means such, for example, as by keying the same to the shaft 20. Pivotally connected at the end of the bifurcated arm 27 is a link 28. The opposite end of the link 28 is pivotally connected to an arm 29 secured to the pin crank shaft 22. As herein illustrated, the link 28 is curved throughout its length in order to clear the brake shaft 20 during the operation.

From the foregoing it will be obvious that the brake operating linkage between the shafts is proportioned so as to give practically a uniformly increasingly applied force at the live end of the brake band for a constant force applied at the end of the brake actuating lever 21, throughout the normal operating range of the mechanism. The linkage is also proportioned so that the uniformly increasing applied force at the brake band does not approach an infinity as a maximum beyond the operating range but rather approaches a definite maximum force from which point the applied load decreases. To attain this operating condition, the linkage is proportioned so that the effective crank length of the arm 29 approaches zero length before the effective crank length of the arm 27 approaches zero. The arms 27 and 29 are shown in the present embodiment of my invention as being of substantially the same length and having opposed directions of rotation by virtue of their relative location and connection by means of the link 28.

In the modified form of this invention illustrated in Figure 4, similar parts are numbered with similar numbers with the addition of an exponent "a". In this modified form of my invention, substantially the same parts are employed except that the means connecting the shaft 20ª with the crank pin shaft 22ª are modified to employ irregular gears 30ª and 31ª which mesh at their teeth.

The gear 30ª is secured to the shaft 20ª at a point near one end of the gear, and the gear 31ª is secured to the crank pin shaft 22ª at a point near the opposed end of the gear 31ª. In this manner as the lever 21ª is depressed, the lever arm acting to tighten the brake band applied through the gear 30ª to the gear 31ª decreases as the arm 21ª is depressed so that the brake band 3ª is quickly brought into gripping position and slowly tightened, and when the lever 21ª is moved to release the grip of the brake band 3ª against the brake rim 2ª, the lever arm at that time from the gear 30ª to the gear 31ª being decreased, a short releasing movement of the brake operating handle 21ª quickly increases the brake arm and causes the brake band 3ª to quickly release from the brake rim.

The modification of this invention illustrated in Figure 4 is substantially the same as that illustrated in Figures 1 to 3 inclusive, except that in Figures 1 to 3 inclusive the link 28 is connected between the points A and B of the gears 30ª and 31ª and the gear teeth are eliminated. Substantially identical results are obtained in a much less expensive manner when employing the construction illustrated in Figures 1 to 3 inclusive.

In the modified form of the invention illustrated in Figure 5, similar parts have been indicated with similar numerals with the addition of an exponent "b". In this modification of my invention, the live ends 16ᵇ of the brake band are connected with a traveling pin 32ᵇ. The traveling pin 32ᵇ is loosely supported by the brake operating lever 21ᵇ in a slot 33ᵇ. The pin 32ᵇ also travels in an arcuate or cam slot 34ᵇ formed in the bracket 35ᵇ. In this way the lever arm between the operating handle 21ᵇ and the live end 16ᵇ of the brake band 3ᵇ may be varied in a manner identical with that obtained in the modifications illustrated in Figures 1, 2, 3 and 4.

In either of the modifications of my invention here shown the action is similar, so that assuming a regular rate of movement of the brake actuating lever 21, 21ª or 21ᵇ to tighten the respective brake bands on their brake rims continued movement results in a decelerating movement of the brake crank arm connected with the "live end" of the brake band to tighten the brake band on its brake rim. When the action is reversed with uniform movement of the actuating lever, the releasing action of the brake bands is accelerated.

With this construction a greater braking torque in actual pound-feet may be applied to a brake rim with a given amount of movement of the brake lever, and the torque may be applied more uniformly throughout the movement of the brake lever than where the "live ends" of a brake band are directly connected with an actuating crank arm.

The eccentric gear type of Figure 4, the cam type of Figure 5, and the link-arm type of Figures 1, 2 and 3 are substantially identical in these respects. In each case the acceleration or deceleration of movement of the brake bands is practically uniform.

Having fully described my invention, it is to be understood that I do not wish to be limited to the details herein set forth, but my invention is of the full scope of the appended claims.

I claim:

1. A variable leverage device for a brake actuating mechanism, including the combination of a first shaft, a second shaft spaced from said first shaft, a first crank arm extending forwardly from said first shaft, a second crank arm extending rearwardly from said second shaft, a link operatively connecting said arms so that as one of said arms approaches its maximum lever arm with said link, the other of said arms will approach its minimum lever arm with said link, a brake band, a third crank arm operatively connected to said brake band and mounted upon said second shaft in relation to said second crank arm as to approach a minimum lever arm when the second crank arm approaches its maximum lever arm.

2. A compound leverage device for a brake actuating mechanism, including the combination of a first shaft, a second shaft spaced from said first shaft, a first crank arm extending forwardly from said first shaft, a second crank arm extending rearwardly from said second shaft, a link operatively connecting said crank arms so that as one of said crank arms approaches its maximum lever arm with said link, the other of said crank arms will approach its minimum lever arm with said link and so that the initial rotation of said first shaft will cause a decelerated rotation of said second shaft, while the final rotation of said first shaft will cause a decelerated rotation of said second shaft, a brake band, a third crank arm operatively connected to said brake band and mounted upon said second shaft in relation with said second crank arm as to approach a minimum lever arm when said second crank arm approaches its maximum lever arm.

3. A variable leverage device for brake actuating mechanisms including the combination of a first shaft, a second shaft spaced from the first shaft, said shafts having opposed directions of rotation, a brake lever to actuate the first shaft, a crank mounted on the second shaft, means connecting the crank of the second shaft with a brake band, a lever arm extending rearwardly on the second shaft to rotate with the crank, a lever arm extending forwardly on the first shaft to rotate with the brake lever, a link connecting the two said lever arms, said lever arms being of substantially the same length and the effective length of the lever arm on the second shaft operating at substantially its maximum length when the brake is in the applied position while the effective length of the lever arm of the first shaft is materially less than that of the lever arm on the second shaft.

4. A variable leverage device for brake actuating mechanism including the combination of a first shaft, a second shaft spaced from the first shaft, the directions of rotation of said shafts being opposed, a brake lever to actuate the first shaft, a crank mounted on the second shaft, means connecting the crank of the second shaft with a brake band, a lever extending rearwardly on the second shaft to rotate with the crank, a lever arm extending forwardly on the first shaft to rotate with the brake lever, a link connecting the two said lever arms, said lever arms being of substantially the same length, the effective length of the lever arm on the second shaft operating at substantially its maximum length while the lever arm on the first shaft approaches its minimum effective length in the applied position, and the effective length of the lever arm on the second shaft approaching zero before the effective length of the lever arm on the first shaft approaches zero length.

FORREST JOSEPH YOUNG.